United States Patent
Yoon et al.

(10) Patent No.: US 9,881,591 B2
(45) Date of Patent: Jan. 30, 2018

(54) APPARATUS AND METHOD FOR DISPLAYING IN ENERGY MANAGEMENT SYSTEM

(71) Applicant: LSIS CO., LTD., Gyeonggi-do (KR)

(72) Inventors: Yeo-Chang Yoon, Gyeonggi-do (KR); Myung-Hwan Lee, Gyeonggi-do (KR); Jong-Ho Park, Gyeonggi-do (KR)

(73) Assignee: LSIS CO., LTD., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 15/213,637

(22) Filed: Jul. 19, 2016

(65) Prior Publication Data

US 2017/0032765 A1    Feb. 2, 2017

(30) Foreign Application Priority Data

Jul. 29, 2015   (KR) .................. 10-2015-0107511

(51) Int. Cl.
| | |
|---|---|
| *G09G 5/393* | (2006.01) |
| *G09G 5/399* | (2006.01) |
| *G05F 1/66* | (2006.01) |
| *G09G 5/395* | (2006.01) |
| *G06F 3/14* | (2006.01) |
| *G06Q 50/06* | (2012.01) |

(52) U.S. Cl.
CPC ............ *G09G 5/395* (2013.01); *G05F 1/66* (2013.01); *G06F 3/14* (2013.01); *G09G 5/393* (2013.01); *G09G 5/399* (2013.01); *G06Q 50/06* (2013.01); *G09G 2320/0252* (2013.01)

(58) Field of Classification Search
None
See application file for complete search history.

(56) References Cited

U.S. PATENT DOCUMENTS

| | | |
|---|---|---|
| 7,262,776 B1 | 8/2007 | Wilt et al. |
| 7,538,772 B1 | 5/2009 | Fouladi et al. |
| 8,004,535 B2 | 8/2011 | Blaukopf et al. |
| | (Continued) | |

FOREIGN PATENT DOCUMENTS

| | | |
|---|---|---|
| EP | 2672480 A1 | 12/2013 |
| JP | 2003030641 A | 1/2003 |
| | (Continued) | |

OTHER PUBLICATIONS

Korean Office Action issued in Application No. 10-2015-0107511 dated Jun. 13, 2016, in 5 pages.

(Continued)

*Primary Examiner* — Joni Richer
(74) *Attorney, Agent, or Firm* — K&L Gates, LLP (57) ABSTRACT

Embodiments of a display apparatus of an energy management system are presented. The display apparatus may include: a first screen updating unit including a drawing unit configured to determine a screen to be output based on a screen operation input and update data and an object included in the determined screen to configure an output-scheduled screen and a first temporary storage unit configured to store the configured output-scheduled screen; and a second screen updating unit configured to receive the stored output-scheduled screen and output the received output-scheduled screen through a screen output unit.

3 Claims, 9 Drawing Sheets

(56) References Cited

U.S. PATENT DOCUMENTS

| | | | |
|---|---|---|---|
| 8,692,838 B2 | 4/2014 | Wiley et al. | |
| 2011/0148892 A1* | 6/2011 | Shreiner | G06T 11/40 345/545 |
| 2013/0278589 A1 | 10/2013 | Liu et al. | |
| 2016/0161964 A1* | 6/2016 | Sato | G06F 13/00 700/297 |

FOREIGN PATENT DOCUMENTS

| | | |
|---|---|---|
| JP | 5149985 B2 | 2/2013 |
| KR | 20080031595 A | 4/2008 |
| KR | 10-1054349 B1 | 8/2011 |
| KR | 20140142055 A | 12/2014 |

OTHER PUBLICATIONS

European Search Report dated Nov. 8, 2016 corresponding to application No. 16174279.6-1904.

* cited by examiner

FIG. 1

PRIOR ART

FIG. 2

PRIOR ART

FIG. 3

PRIOR ART

FIG. 4

PRIOR ART

APPARATUS AND METHOD FOR DISPLAYING IN ENERGY MANAGEMENT SYSTEM

CROSS REFERENCE TO RELATED APPLICATIONS

This application claims the benefit of Korean Patent Application No. 10-2015-0107511, filed on Jul. 29, 2015 and entitled "APPARATUS AND METHOD FOR DISPLAYING IN ENERGY MANAGEMENT SYSTEM", which is hereby incorporated by reference in its entirety.

BACKGROUND

Technical Field

The present disclosure relates to an energy management system and more particularly, to an apparatus and method for configuring a screen provided for a client in an energy management system.

Description of the Related Art

Under circumstances of increased government regulation for improvement of energy efficiency and reduction of greenhouse gas, increased burden on energy costs, insufficient supply of power, and so on, there is a rising interest in reducing energy consumption and improving energy efficiency. Although the reduction of energy consumption requires measures which are systematic, sustainable and effective, satisfactory means have not been suggested until now. Therefore, for the purpose of reduction of energy consumption, there is a need of powerful means for determining where and how much energy is consumed, discovering factors of energy dissipation, and finding and fulfilling improvement plans.

As such means, an energy management system (EMS) capable of monitoring and controlling a flow of energy is receiving the global spotlight. The energy management system is an integrated energy management solution capable of optimizing energy consumption by monitoring situations of energy consumption in real time and analyzing an aggregation of data based on hardware, software and ICT-based monitoring and control techniques.

In order to monitor the status of energy use in real time in an energy management system, it is necessary to display the status of operation of the energy management system. Hereinafter, a configuration and operation of a display apparatus in a typical energy management system will be described with reference to FIGS. 1 to 4.

Figure 1:
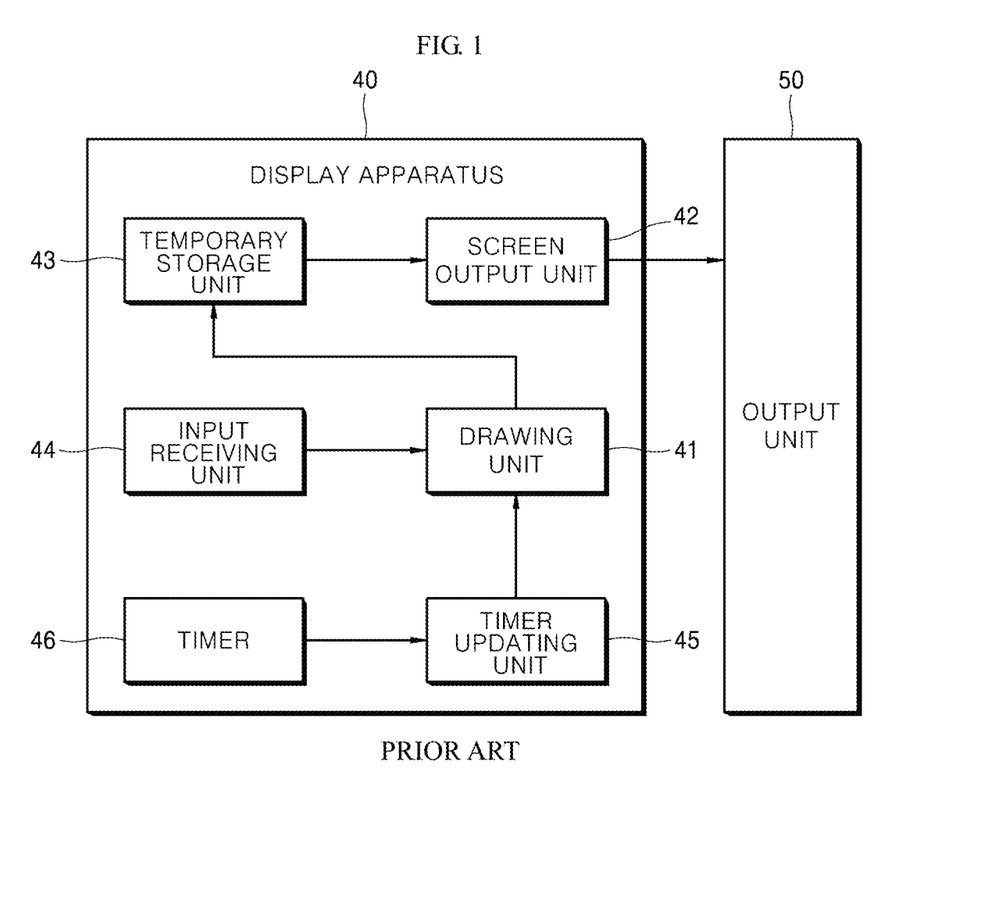
FIG. 1 is a block diagram showing a conventional display apparatus, according to the prior art.

FIG. 1 is a block diagram showing a conventional display apparatus.

Referring to FIG. 1, a conventional display apparatus 40 includes a timer 46, a data updating unit 45, a drawing unit 41, an input receiving unit 44, a temporary storage unit 43 and a screen output unit 42. The displaying apparatus 40 may be incorporated in an energy management system.

The timer 46 informs the data updating unit 45 of a data update period. The display apparatus 40 updates data displayed on a screen for each predetermined period. The display apparatus 40 can offer varying data having its shorter update period to a user more quickly. However, in this case, since a period during which logic for a screen output is performed becomes shorter, a big load may be imposed on the system. Conversely, a longer update period can provide a longer period during which the logic for the screen output is performed, which may result in reduction of the system load. However, this has a problem that the display apparatus 40 cannot offer the varying data to the user immediately. In general, a screen update period may be set to 2 seconds. This period is not fixed but may be differently set depending on the size of data to be displayed.

The input receiving unit 44 receives an input from the user. The input received from the user may be one of click, screen contraction/extension and scroll operation. Data displayable on one screen are typically limitative, but the display apparatus 40 can receive the user input and display data which are not currently being output to the screen.

The data updating unit 45 updates the data displayed on the screen. In addition, the data updating unit 45 can reflect the updated data to change an object to be displayed on the screen. For example, the data updating unit 45 changes a graph to be output according to the data. The data updating unit 45 receives the update period from the timer 46 and can update the data for each received update period.

The drawing unit 41 calculates and updates a screen to be actually displayed. Specifically, the drawing unit 41 receives the updated data from the data updating unit 45 and receives the user input from the input receiving unit 44. Then, the drawing unit 41 calculates and updates the screen to be actually displayed, based on the received user input. For example, an input indicating only an amount of power may be received in the input receiving unit 44. In this case, the drawing unit 41 calculates only a screen for the amount of power and updates the screen based on the data received from the data updating unit 45.

The temporary storage unit 43 stores a screen provided to the screen output unit 42. Specifically, the display apparatus 40 cannot simultaneously perform an operation of drawing a screen and an operation of displaying the screen. Therefore, there may occur a flickering effect in which the screen cannot be displayed in a time interval during which the screen is drawn. The temporary storage unit 43 temporarily can store a next screen to be provided to the screen output unit 42 and provide the stored screen to the screen output unit 42 in order to minimize the above-mentioned flickering effect. The operation of the display apparatus 40 will be described in detail later.

The screen output unit 42 actually draws a screen output to an output unit 50. Specifically, the screen output unit 42 configures a screen which can be output to the output unit 50, based on the screen stored in the temporary storage unit 43.

The output unit 50 receives a screen from the display apparatus 40 and outputs the received screen. The output unit 50 may be incorporated in the display apparatus 40.

Hereinafter, the operation of the conventional display apparatus 40 will be described in detail with reference to FIG. 2.

Figure 2:
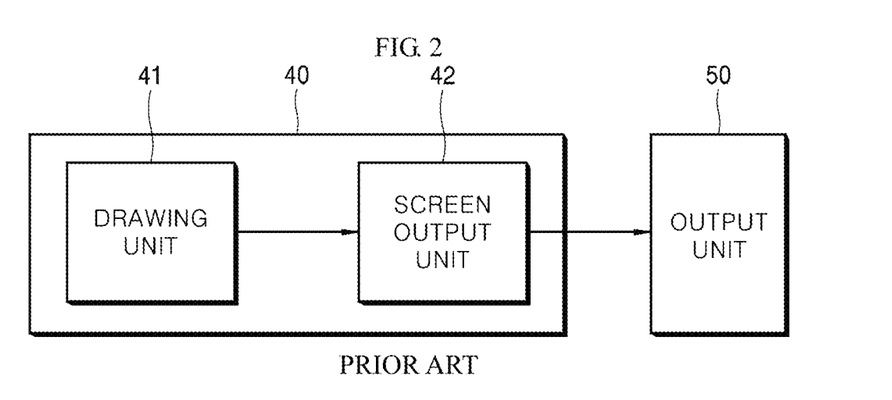
FIG. 2 shows one example of an operation of the conventional display apparatus 40, according to the prior art.

FIG. 2 shows one example of an operation of the conventional display apparatus 40.

As shown in FIG. 2, the drawing unit 41 calculates a screen to be displayed, updates the calculated screen, and delivers the updated screen to the screen output unit 42. The screen output unit 42 draws the delivered screen in the form which can be output to the output unit 50 and delivers the drawn screen to the output unit 50.

However, in this case, the operation of the drawing unit 41 to calculate and update the screen to be displayed and the operation of the screen output unit 42 to copy the updated screen cannot be simultaneously performed. Specifically, since the drawing unit 41 and the screen output unit 42 are incorporated in the single display apparatus 40, these units have to be operated according to a series of sequences. In other words, while the drawing unit 41 is being operated, the screen output unit 42 cannot deliver the updated screen from the drawing unit 41 to the output unit 50 in real time.

Accordingly, the screen updating operation in the drawing unit 41 and the updated screen copying operation in the screen output unit 42 are sequentially performed, thereby causing the screen flickering effect. If the number of data or objects to be displayed on the screen is small, the above-described operations may be performed so quickly as not to cause the screen flickering effect. However, since the number of data and objects to be displayed in the energy management system is very large, the screen flickering effect is unavoidable.

Figure 3:
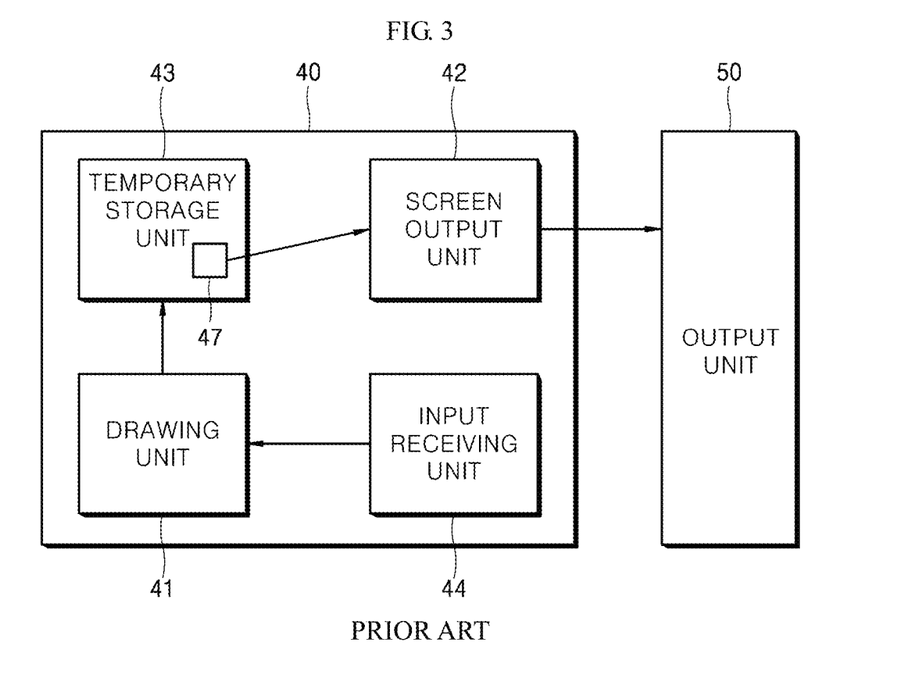
FIGS. 3 and 4 show examples of an operation of the conventional display apparatus 40 to solve a flickering effect of FIG. 2, according to the prior art.
Figure 4:
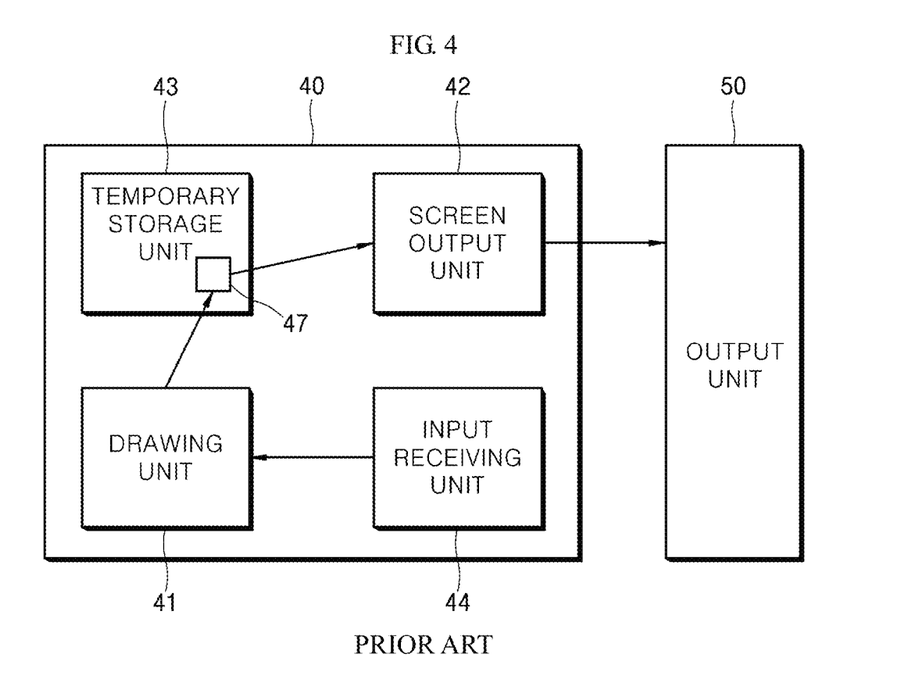

FIGS. 3 and 4 show examples of an operation of the conventional display apparatus 40 to solve the flickering effect of FIG. 2. The operation of the display apparatus 40 shown in FIGS. 3 and 4 may be referred to as a double buffering technique.

In the examples of FIGS. 3 and 4, the display apparatus 40 further includes a temporary storage unit 43. The temporary storage unit 43 stores in advance a screen next to the screen being currently output from the screen output unit 42. Accordingly, the drawing unit 41 can store in advance the screen next to the screen being currently output to the temporary storage unit 43 and the screen output unit 42 can copy the stored screen from the temporary storage unit 43 and provide a user with the copied screen with no flickering effect.

In the example of FIG. 3, the drawing unit 41 stores the entire screen, which is to be updated, in the temporary storage unit 43 and the screen output unit 42 copies only some screen 47 to be output, based on an input from the input receiving unit 44.

In addition, in the example of FIG. 4, the drawing unit 41 calculates and updates only some screen 47 to be output, based on an input from the input receiving unit 44. The updated some screen 47 is stored in the temporary storage unit 43. Then, the screen output unit 42 copies the some screen 47 stored in the temporary storage unit 43. As compared to the example of FIG. 3, in the example of FIG. 4, the size of a screen to be updated in the drawing unit 41 is small, thereby allowing a system load to be further reduced.

However, the above double buffering technique has a limitation in that the screen updating operation is performed in a single configuration. Specifically, the display apparatus 40 has a limitation in that a screen is first updated and the updated screen is then output.

SUMMARY

It is an aspect of some embodiments of the present disclosure to provide a display apparatus and method of an energy management system, which is capable of performing a screen output of the energy management system with high efficiency.

It is another aspect of some embodiments of the present disclosure to provide a display apparatus and method of an energy management system, which is capable of changing a screen outputting method of the energy management system to increase a speed of response to a user input.

In accordance with one aspect of some embodiments of the present disclosure, there is provided a display apparatus of an energy management system, including: a first screen updating unit including a drawing unit configured to determine a screen to be output based on a screen operation input and update data and an object included in the determined screen to configure an output-scheduled screen and a first temporary storage unit configured to store the configured output-scheduled screen; and a second screen updating unit configured to receive the stored output-scheduled screen and output the received output-scheduled screen through a screen output unit.

In one embodiment, the first screen updating unit and the second screen updating unit may operate independent of each other.

In one embodiment, the first screen updating unit may set a section, which cannot be delivered to the second screen updating unit, in the output-scheduled screen.

In one embodiment, the first screen updating unit may further include a second temporary storage unit configured to copy the output-scheduled screen stored in the first temporary storage unit.

In one embodiment, the drawing unit may store the entire output-scheduled screen in the first temporary storage unit, and the second temporary storage unit may copy some of the output-scheduled screen stored in the first temporary storage unit based on the screen operation input.

In one embodiment, the first screen updating unit may store a first output-scheduled screen in the first temporary storage unit and deliver a second output-scheduled screen stored in the second temporary storage unit to the second screen updating unit.

According to one embodiment of the present disclosure, it is possible to provide a display apparatus and method of an energy management system, which is capable of performing a screen output of the energy management system with high efficiency.

According to one embodiment of the present disclosure, it is possible to provide a display apparatus and method of an energy management system, which is capable of changing a screen outputting method of the energy management system to increase a speed of response to a user input.

DETAILED DESCRIPTION

Hereinafter, embodiments of the present disclosure will be described in detail with reference to the accompanying drawings. It should be understood that the present disclosure is not limited to the following embodiments, and that the embodiments are provided for illustrative purposes only.

The scope of the disclosure should be defined only by the accompanying claims and equivalents thereof.

In the following description, the terms "module" and "part," which are suffixes for elements, are given or used alone or in combination for the purpose of facilitating the description, but these terms are not intended to make a distinction between both.

Combinations of blocks in the accompanying drawings and steps in a flow chart may be performed according to computer program instructions. These computer program instructions can be installed in general-purpose computers, special-purpose computers or other processors of programmable data processing equipment. Therefore, the instructions executed by the computers or other processors of programmable data processing equipment create means for performing functions described in blocks in the drawings or in steps in the flow chart. These computer program instructions can be stored in computer-usable or computer-readable memories which can assist in the computers or other processors of programmable data processing equipment to implement particular functions in particular manners. Therefore, the instructions stored in the computer-usable or computer-readable memories can be used to make products containing instruction means for performing the functions described in the blocks in the drawings or in the steps in the flow chart. The computer program instructions can also be installed in the computers or other processors of programmable data processing equipment. Therefore, a sequence of operation steps can be performed on the computers or other processors of programmable data processing equipment to produce computer-executable processes. In addition, the instructions operating the computers or other processors of programmable data processing equipment can provide steps for executing the functions described in the blocks in the drawings or in the steps in the flow chart.

In addition, the blocks or the steps may represent portions of modules, segments or codes including one or more executable instructions for executing a specified logical function(s). In addition, in some alternative embodiments, it should be noted that the functions described in the blocks or steps may be performed out of a specified sequence. For example, two successive blocks or steps may be performed substantially at once or may be sometimes performed in a reverse order depending on a corresponding function.

An energy management system (EMS) may have a variety of screens for a single line diagram, system monitoring, demand estimation, and so on. Each of the screens may include a figure object through which data can be visually displayed. The figure object may include a line, a rectangle, a circle, a text, and so on.

In general, a display apparatus updates each of the screens in real time. The display apparatus has to have a fast response to a user input. The user input may be one of click, screen contraction/extension and scroll operation. The display apparatus has to output a screen to be periodically updated, according to the user input. However, more complicated logic for update of the screen makes it more difficult to make an instant response to the user input. In particular, with increase in the number of objects and data to be displayed on the screen, it takes a longer time for the display apparatus to perform the logic for update of the screen. This may result in an inconvenience in screen operation by a user. Therefore, hereinafter, a method for outputting a screen in an instant response to the user input will be described.

An embodiment of the present disclosure will now be described with reference to the drawings.

Figure 5:
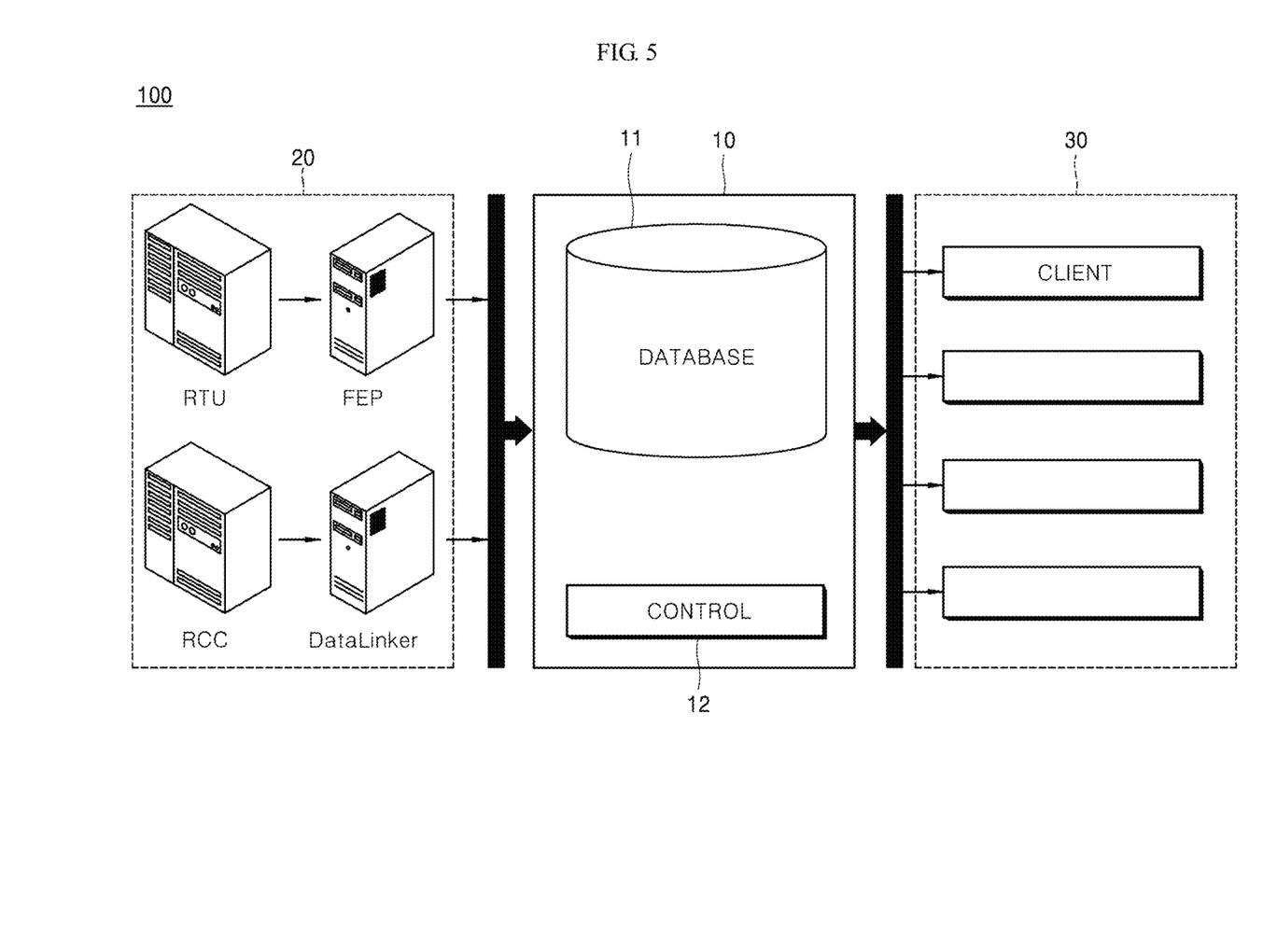
FIG. 5 is a block diagram showing the configuration of an energy management system according to an embodiment of the present disclosure.

FIG. 5 is a block diagram showing the configuration of an energy management system according to an embodiment of the present disclosure.

Referring to FIG. 5, an energy management system 100 according to an embodiment of the present disclosure may include an energy management server 10, a client 30 and a power system 20.

The energy management server 10 can receive data from the power system 20 and create the data in the form of a database. In addition, the energy management server 10 can provide the database to the client 30. In addition, the energy management server 10 can manage and control the power system 20. The energy management server 10 may be connected to a plurality of clients 30. In addition, the energy management server 10 may have a dual structure.

The energy management server 10 may include a database 11 and a control unit 12.

The database 11 can collect/store measurement data received from the power system 20 and store operational data based on the measurement data for each predetermined period. In addition, the database 11 can automatically create and store a list of measurement and operational data and store a list of policy data.

The control unit 12 can control the overall operation of the energy management server 10. In some embodiments, the control unit 12 can create the database 11 by processing data delivered from the power system 20. In other embodiments, the control unit 12 can provide specified data to the client 30 at a request from the client 30.

As described earlier, the conventional typical display apparatus has a limitation in that the double buffering technique cannot offer an updated screen to a user promptly. Therefore, one embodiment of the present disclosure to overcome this limitation will be described below with reference to FIGS. 6 to 9.

Figure 6:
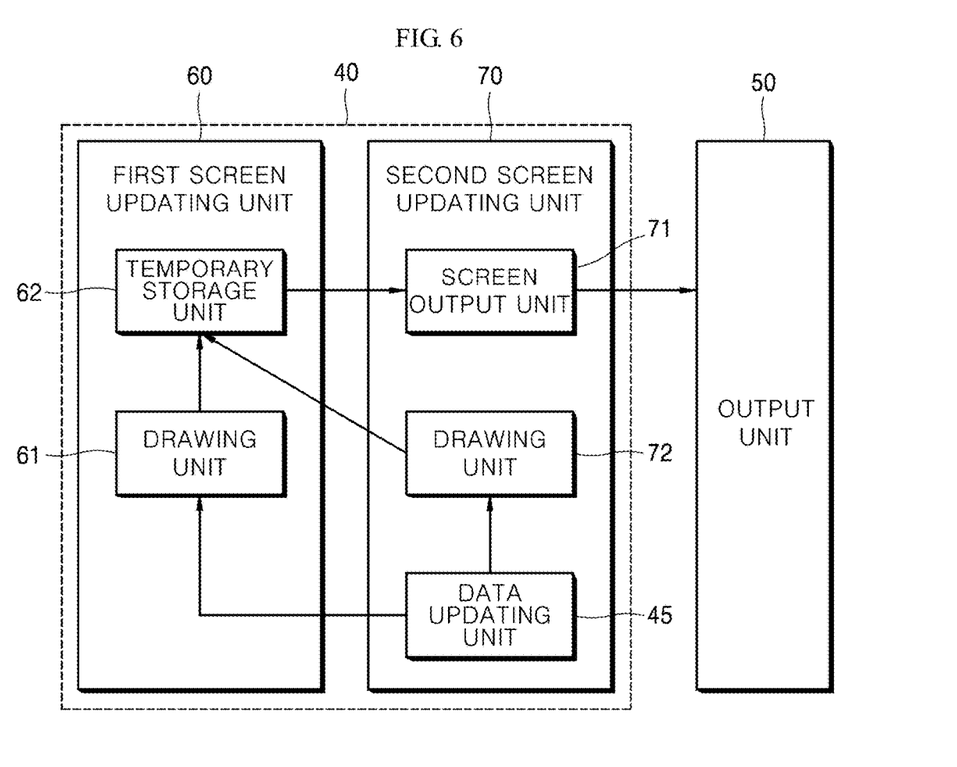
FIG. 6 is a block diagram showing the configuration of a display apparatus according to one embodiment of the present disclosure.

FIG. 6 is a block diagram showing the configuration of a display apparatus 40 according to one embodiment of the present disclosure.

The display apparatus 40 according to one embodiment of the present disclosure may include a first screen updating unit 60 and a second screen updating unit 70, which are separate from each other. The first screen updating unit 60 and the second screen updating unit 70 operate independent of each other. Specifically, an operation of updating a screen in a drawing unit 61 and an operation of copying a screen to be output in a screen output unit 71 can be performed independent of each other.

Accordingly, as shown in FIG. 6, the first screen updating unit 60 continues to store only an updated screen in a temporary storage unit 62 through the drawing unit 61 and the screen output unit 71 of the second screen updating unit 70 performs an operation of copying the screen stored in the temporary storage unit 62 without logic for finding an object and data, which are to be output, from the updated screen.

Figure 7:
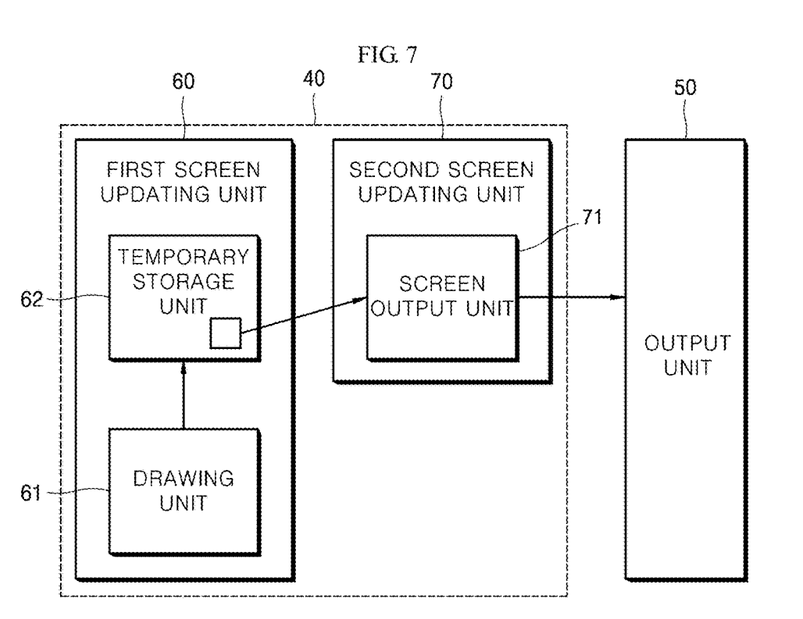
FIG. 7 is a view showing a procedure of the essential operation of the display apparatus according to one embodiment of the present disclosure.

FIG. 7 is a view showing a procedure of the essential operation of the display apparatus 40 according to one embodiment of the present disclosure.

As shown in FIG. 7, the first screen updating unit 60 includes the drawing unit 61 and the temporary storage unit 62. The first screen updating unit 60 updates the data and object, which are scheduled to be output, through the drawing unit 61 and stores the updated data and object in the temporary storage unit 62. This procedure may refer to that the drawing unit 61 draws an output-scheduled screen in the temporary storage unit 62.

On the other hand, the screen output unit 71 of the second screen updating unit 70 copies the output-scheduled screen from the temporary storage unit 62 while outputting the screen through the output unit 50.

However, in the embodiment of FIG. 7, while the screen to be updated is being stored in the temporary storage unit 62, the screen output unit 71 may copy the output-scheduled screen. This is because a screen updating subject and a screen outputting subject operate independent of each other. In this case, a screen to be output by the display apparatus 40 cannot be normally displayed. Accordingly, the first screen updating unit 60 may set a critical section in the output-scheduled screen stored in the temporary storage unit 62. The term 'critical section' used herein refers to a copy-disallowed section in the output-scheduled screen stored in the temporary storage unit 62. The critical section set by the first screen updating unit 60 can prevent an incomplete section from being copied from the output-scheduled screen being stored (or being drawn).

Figure 8:
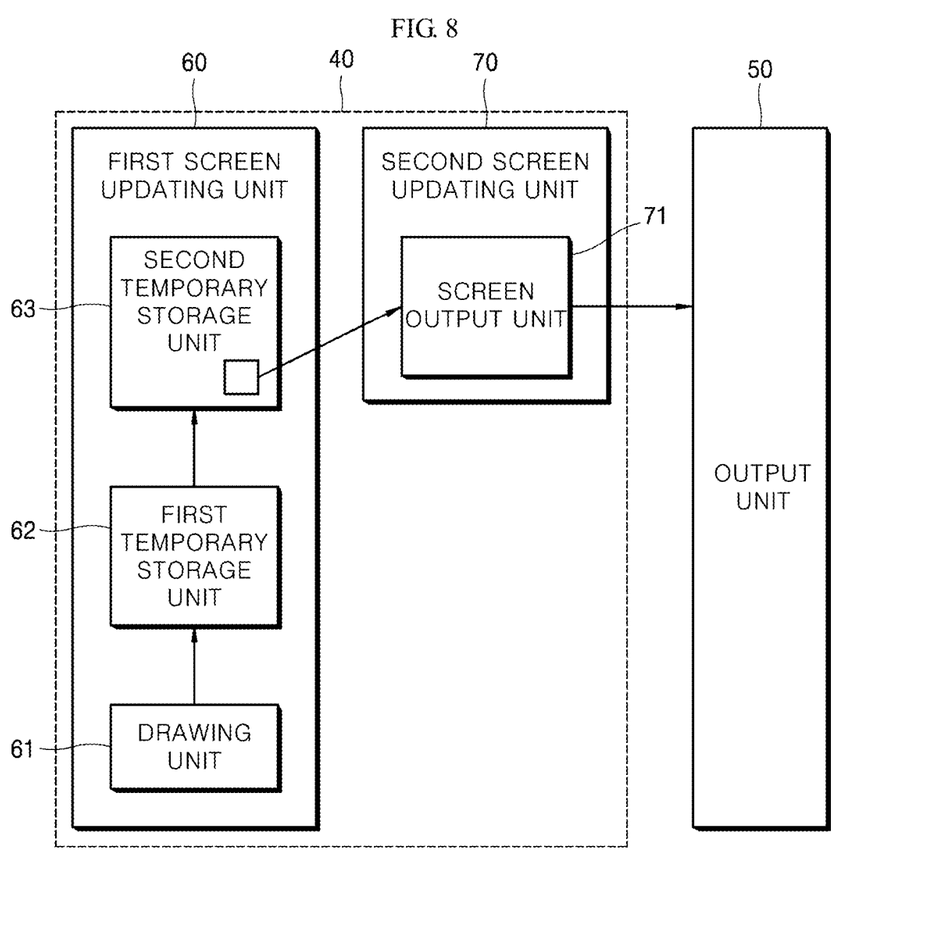
FIG. 8 is a view showing an operation of the display apparatus with no need of a critical section according to one embodiment of the present disclosure.

FIG. 8 is a view showing an operation of the display apparatus with no need of a critical section according to one embodiment of the present disclosure.

As shown in FIG. 8, the first screen updating unit 60 includes a first temporary storage unit 62 and a second temporary storage unit 63. These two temporary storage units 62 and 63 allow an output-scheduled screen to be delivered to the screen output unit 71 without setting a critical section.

Specifically, the drawing unit 61 calculates data and an object to be updated, based on a user input. Then, the drawing unit 61 stores an output-scheduled screen based on the calculation in the first temporary storage unit 62. After storing the output-scheduled screen, the first temporary storage unit 62 delivers the output-scheduled screen to the second temporary storage unit 63.

At this time, in one embodiment, the drawing unit 61 may store only some screen, which is to be output, in the first temporary storage unit 62. In another embodiment, the drawing unit 61 may store the entire screen, which is to be output, in the first temporary storage unit 62 and the first temporary storage unit 62 may deliver only some screen to the second temporary storage unit 63 based on a user input. In another embodiment, the drawing unit 61 may divide the entire screen, which is to be output, into predetermined screen areas which are then stored in the first temporary storage unit 62. Then, the first temporary storage unit 62 may sequentially deliver the stored screen areas to the second temporary storage unit 63 based on a user input. At this time, in the sequence of delivery of the stored screen areas from the first temporary storage unit 62 to the second temporary storage unit 63, a screen area with updated data and object may be prioritized based on a user input.

According to the embodiment of FIG. 8, since the screen output unit 71 of the second screen updating unit 70 can always copy the complete output-scheduled screen from the second temporary storage unit 63, there is no need to set a critical section separately. In addition, as opposed to the procedure in which the drawing unit 61 stores the output-scheduled screen in the first temporary storage unit 62, the procedure in which the stored output-scheduled screen is copied in the second temporary storage unit 63 is relatively simple so as to have less effect on a system load.

Figure 9:
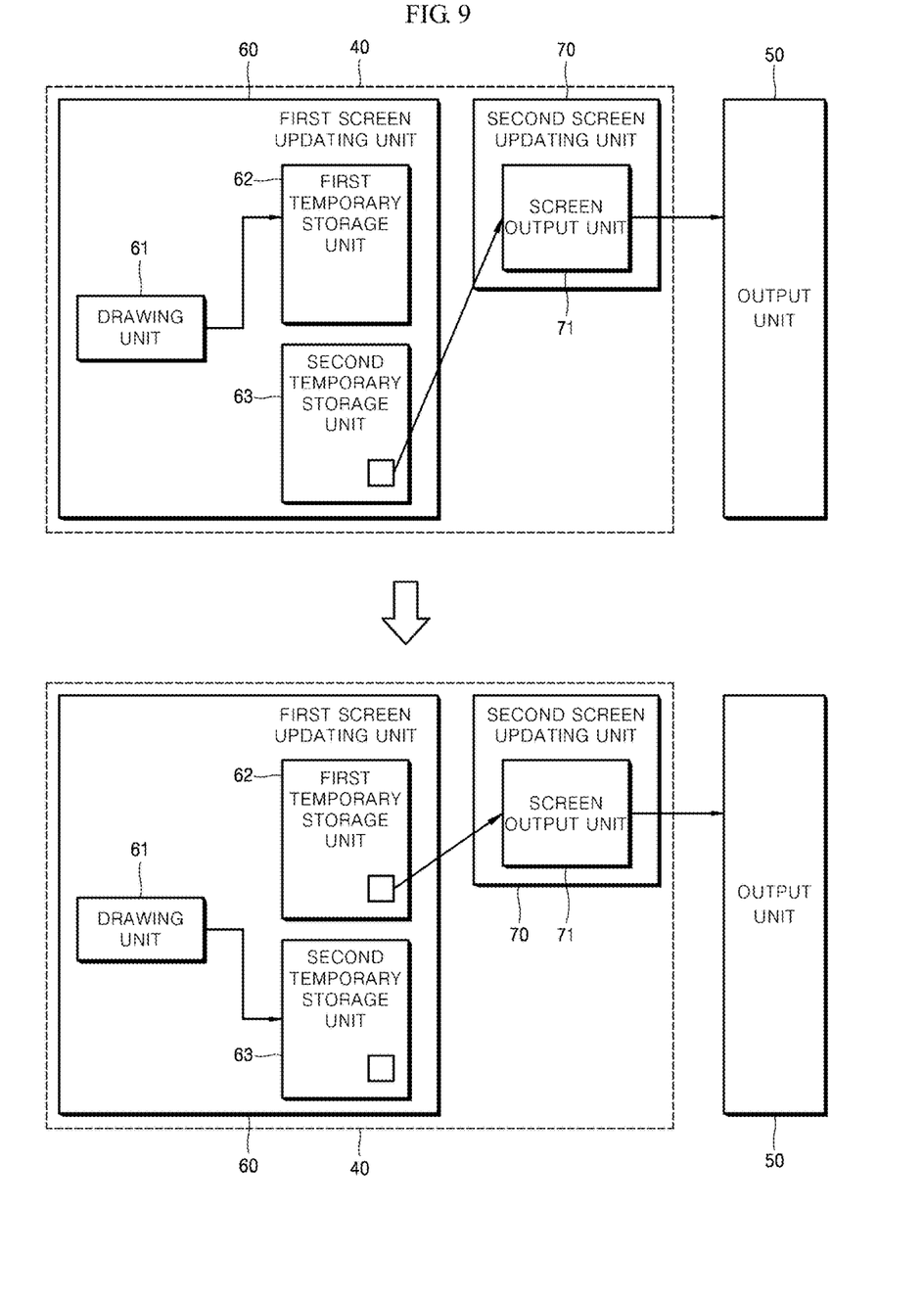
FIG. 9 is a view showing a display apparatus according to another embodiment of the present disclosure.

FIG. 9 is a view showing a display apparatus 40 according to another embodiment of the present disclosure.

In the embodiment of FIG. 8, the operation of storing the output-scheduled screen in the first temporary storage unit 62 and the operation of copying the stored screen in the second temporary storage unit 63 are sequentially performed. As opposed to this, in the embodiment of FIG. 9, in the first screen updating unit 60, the drawing unit 61 stores the output-scheduled screen in the first temporary storage unit 62 and the output-scheduled screen stored in the second temporary storage unit 63 is delivered to the screen output unit 71. Then, again, the drawing unit 61 stores the output-scheduled screen in the second temporary storage unit 63 and the output-scheduled screen stored in the first temporary storage unit 62 is delivered to the screen output unit 71.

Accordingly, the operation of storing the output-scheduled screen in the temporary storage units and the operation of delivering the stored screens can be simultaneously performed so as to achieve efficiency double as high as that in the embodiment of FIG. 8. In addition, in the embodiment of FIG. 9, there is no need to set a critical section, like the embodiment of FIG. 8.

In one embodiment of the present disclosure, a display apparatus may include two or more screen updating units. In addition, a screen updating unit may include two or more temporary storage units.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A display apparatus of an energy management system, comprising:
   a first screen updating unit including a drawing part configured to determine a screen to be output based on a screen operation input and update data and an object included in the determined screen to configure an output-scheduled screen and a first temporary storage part configured to store the configured output-scheduled screen; and
   a second screen updating unit configured to receive the storage output-scheduled screen and output the received output-scheduled screen through a screen output unit,
      wherein the first screen updating unit and the second screen updating unit are configured to operate independent of each other, and
      characterized in that the first screen updating unit further includes a second temporary storage part configured to copy the output-scheduled screen stored in the second temporary storage part to the second screen updating unit, wherein the drawing part stores the entire output-scheduled screen in the first temporary storage part, and wherein the second temporary storage part copies some of the output-scheduled screen stored in the first temporary storage part based on the screen operation input.

2. The display apparatus according to claim 1, wherein the first screen updating unit is further configured to set a section, which cannot be delivered to the second screen updating unit, in the output-scheduled screen.

3. The display apparatus according to claim 1, wherein the drawing part is further configured to store some of the output-scheduled screen in the first temporary storage part, and wherein the second temporary storage part is further configured to copy the some output-scheduled screen stored in the first temporary storage part.

* * * * *